United States Patent

Hallman et al.

[15] 3,663,224

[45] May 16, 1972

[54] ELECTRICAL COMPONENTS, ELECTRICAL CIRCUITS, AND THE LIKE, AND METHODS FOR MAKING THE SAME BY MEANS OF RADIATION SENSITIVE ELEMENTS

[72] Inventors: Robert W. Hallman, Utica; Gary W. Kurtz, Southfield, both of Mich.

[73] Assignee: Teeg Research, Inc., Detroit, Mich.

[22] Filed: Nov. 21, 1969

[21] Appl. No.: 878,846

Related U.S. Application Data

[63] Continuation-in-part of Ser. No. 646,109, June 6, 1967, abandoned, which is a continuation-in-part of Ser. No. 591,711, Nov. 3, 1966, abandoned.

[52] U.S. Cl. ....................96/38.4, 250/65, 250/65.1, 29/25.42, 29/593, 29/620, 29/625, 317/258, 338/308

[51] Int. Cl. ....................G03c 5/00, G03c 11/00

[58] Field of Search....................96/1.5, 27, 36, 36.2, 36.3, 96/86, 88, 38.4; 252/501; 117/93.3, 217; 156/3, 4, 17, 18; 29/195, 25.42, 593, 620, 625; 250/65, 65.1; 204/157.1; 317/258; 338/308

[56] References Cited

UNITED STATES PATENTS

| | | | |
|---|---|---|---|
| 3,122,463 | 2/1964 | Ligenza et al | 156/4 |
| 3,271,180 | 9/1966 | White | 96/36 X |
| 3,346,384 | 10/1967 | Gaynor | 96/36 |
| 3,377,169 | 4/1968 | Blake | 96/88 |
| 3,386,823 | 6/1968 | Keller et al. | 96/27 |
| 3,440,046 | 4/1969 | Droege et al. | 96/27 |

FOREIGN PATENTS OR APPLICATIONS

| | | |
|---|---|---|
| 344,354 | 3/1931 | Great Britain |
| 968,141 | 8/1964 | Great Britain |
| 1,151,310 | 9/1969 | Great Britain |

OTHER PUBLICATIONS

Kostyshin et al., " Photographic Sensitivity Effect in Thin Semiconducting Films on Metal Substrates," Soviet Physics-Solid State, Vol. 8, No. 2, Feb. 1966, pp. 451-452.

*Primary Examiner*—George F. Lesmes
*Assistant Examiner*—R. E. Martin
*Attorney*—Hauke, Gifford & Patalidis

[57] ABSTRACT

Electrical components, such as resistors, capacitors, and the like, and electrical circuits and methods for making the same by means of radiation sensitive elements comprising essentially a metallic layer in proximity with and adhering to a layer of an inorganic material capable, when exposed to electromagnetic actinic radiation, to interreact with the metal or metals of the metallic layer. The electrical components and electrical circuits are, according to the method of the invention, "printed" upon the radiation sensitive element by projecting thereon appropriate patterns, and the electrical characteristics of the components and circuits are determined by the geometrical dimensions of the patterns projected upon the radiation sensitive elements and by the amount of irradiation of the elements.

12 Claims, 15 Drawing Figures

INVENTORS
ROBERT W. HALLMAN
GARY W. KURTZ

By Hauke, Gifford & Patalidis
ATTORNEYS

INVENTORS
ROBERT W. HALLMAN
GARY W. KURTZ

By Hauke, Gifford & Patalidis

ATTORNEYS

ELECTRICAL COMPONENTS, ELECTRICAL CIRCUITS, AND THE LIKE, AND METHODS FOR MAKING THE SAME BY MEANS OF RADIATION SENSITIVE ELEMENTS

CROSS REFERENCE TO RELATED APPLICATIONS

The present application is a continuation-in-part of application Ser. No. 646,109, filed June 6, 1967, which is a continuation-in-part of application Ser. No. 591,711, filed Nov. 3, 1966, and now both abandoned. This application is related to co-pending application Ser. No. 841,416, filed July 14, 1969, now U.S. Pat. No. 3,637,383, which is a continuation-in-part of application Ser. No. 627,754, filed Apr. 3, 1967, and now both abandoned and co-pending application Ser. No. 841,718, filed July 15, 1969, now U.S. Pat. No. 3,637,377, which is a continuation-in-part of application Ser. No. 627,813, filed Apr. 3,1967, and now abandoned.

BACKGROUND OF THE INVENTION

In the copending applications, there are disclosed radiation sensitive elements which typically consist of a metallic layer, as defined therein and herein, deposited on a support member or substrate, the metallic layer being coated in turn with an adhering overlayer of inorganic material capable of interreacting with the metallic layer once exposed to electromagnetic actinic radiation such as light radiation and the like. The radiation induced reaction between the metallic layer and the overlayer extends in depth from the interface between the metallic layer and the overlayer proportionately to the exposure of the sensitive element to actinic radiation, causing irradiation induced etching of the metallic layer extending in depth in proportion to the exposure of the sensitive element to such radiation. For sufficient exposure in time and/or actinic radiation intensity, or both, of the radiation sensitive element, the formation of such interreaction product or products is sufficient to consume in depth the totality of the metallic layer. With most materials, there is caused under the influence of exposure to actinic radiation, an atomic or ion migration from the metallic layer into the overlayer such that the interreaction product is, for all practical purposes in the form of a solid solution thereof in the remaining irradiated portions of the overlayer.

SUMMARY OF THE INVENTION

The present invention provides means and methods for utilizing radiation sensitive elements as disclosed in the aforesaid applications for the purpose of obtaining electrical components and electrical circuits, including electrical components and appropriate connections therebetween, by projecting predetermined patterns upon the surface of radiation sensitive elements comprising essentially such metallic layer and such overlayer of an inorganic material capable of interreacting therewith when exposed to radiation. According to the structure of the radiation sensitive element used, and according to the physical appearance and geometrical dimension of the patterns projected thereon, electrical components, such as resistors, capacitors and the like, may thus be obtained by means akin to direct photographic means. Additionally, the electrical properties of the components such as resistance and capacitance may be exactly determined in function of the exposure to radiation, in time, irradiation intensity, or both. Additionally, the invention provides for continuous monitoring of the electrical characteristics of the components or electrical circuits thus formed and for discontinuing exposure of the radiation sensitive element to electromagnetic actinic radiation as soon as predetermined electrical characteristics have been achieved, and for shielding of the electrical component or electrical circuit to protect the same from subsequent exposure to electromagnetic actinic radiation after appropriate electrical characteristics have been achieved.

These and other objects and advantages of the present invention will be readily apparent to those skilled in the art when the following description of a few typical examples of preferred embodiments of radiation sensitive elements and examples of methods contemplated for practicing the invention is read in conjunction with the accompanying drawings.

DESCRIPTION OF THE PREFERRED EMBODIMENTS

The present invention will now be described in detail with respect to examples of means for obtaining individual resistors of a predetermined resistance value, capacitors of a predetermined capacitance value, and integrated circuits including resistors and capacitors of predetermined values, appropriate connections therebetween and appropriate input and output terminals to the electrical circuit. It will be appreciated that the actual physical appearance of the components and elements as herein illustrated are given for illustrative purposes only for the sake of explaining the principles involved in the present invention, and that the means indicated for monitoring the electrical characteristics of the components made according to the methods of the invention are also given for illustrative purpose only, and that many other means are available as will be apparent to those skilled in the art.

Figure 1:
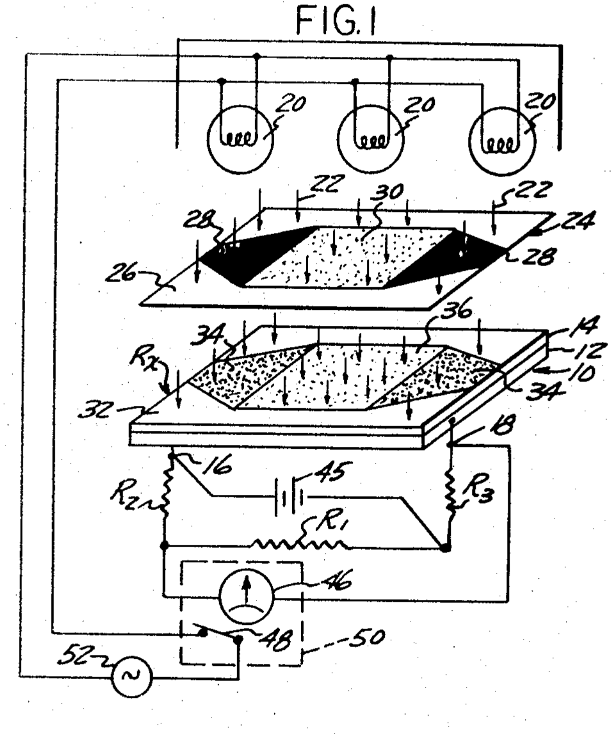
FIG. 1 is a schematic representation of an example of arrangement for obtaining an electrical components, such as a resistor of a predetermined value, according to one aspect of the present invention.
Figure 2:
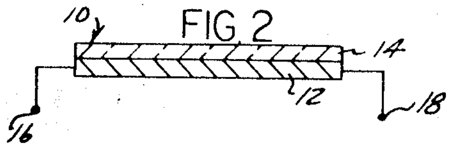
FIG. 2 is a schematic sectional view of an example of radiation sensitive element for use in an arrangement such as shown in FIG. 1.

The present invention utilizes as a radiation sensitive element a member, as shown at 10 in FIGS. 1 and 2, comprising essentially a metallic layer 12 consisting of a thin layer or film of silicon, metal or metals which may be as thin as a few atom layers or as thick as a few angstroms or mills, provided with a layer 14 of an inorganic material capable, when exposed to electromagnetic actinic radiation, to interreact with the silicon, metal or metals of the metallic layer 12 for forming therewith an interaction product or products having a chemical composition, physical characteristics and electrical characteristics, such as resistivity, different from those of the constituents. The layer 14 is also substantially thin, of the same order of thickness as that of metallic layer 12, and is deposited thereon by any conventional means such as vapor deposition, cathode sputtering, etc.

The metallic layer 12 is made of silicon or a metal either alone, alloyed with another metal or with other metals, or in the form of a metallic mixture. The metallic layer 12 thus includes, as indicated in the aforesaid co-pending applications, silicon or any one or several of common metals such as silver, copper, lead, cadmium, zinc, iron, tin, arsenic, bismuth, cobalt, germanium, indium, manganese, mercury, nickel, selenium, silicon, tellurium, thallium, and vanadium.

The inorganic material layer 14 may consist of any one of a variety of ternary and binary inorganic materials and compounds and any one of a few elements. An example of ternary material, which has been found to be particularly suitable, is a glassy material consisting of arsenic, sulfur and iodine for example in the following proportions: arsenic — 40 percent by weight, sulfur — 50 percent by weight and iodine — 10 percent by weight, although the proportion of iodine may be within the range of 1 to 30 percent by weight. Appropriate examples of such ternary materials are given in U.S. Pat. No. 3,024,119, issued Mar. 6, 1962. Chlorine, bromine, selenium, thallium, or tellurium may be substituted for iodine.

A multitude of binary compounds and mixture have been found to be useful for the inorganic material of the layer 14. Examples of such binary compounds or mixtures comprise halides of metals, such as copper, antimony, arsenic, sulfur, thallium, lead, cadmium and silver, and sulfides, arsenides, selenides and tellurides of such metals. The most suitable materials, presenting substantial actinic sensitivity when deposited on a layer of silicon or a metallic layer of copper, silver, lead, zinc, etc., for example are arsenic-sulfur mixtures and compounds, antimony-sulfur compounds and mixtures, silver-sulfur compounds and mixtures, bismuth-sulfur compounds and mixtures, chromium-sulfur compounds and mixtures, lead iodide, copper chloride, stannous chloride, mercury chloride, arsenic selenides, selenium-sulfur compounds and mixtures, chromium selenides and indium-sulfur compounds and mixtures. It seems that the property of reacting with a metallic layer under the influence of electromagnetic actinic radiation is shared by a variety of mixtures and compounds, having such property to varying but generally useful degrees. Such binary compounds and mixtures may be generally cataloged as consisting of a metal halide or a mixture of a metal with a halogen, metal selenide or a mixture of a metal with selenium, metal sulfide or a mixture of a metal with sulfur, and metal telluride or a mixture of a metal with tellurium. Stoichiometric proportions are not critical, but is is preferable that the resulting material be substantially transparent to electromagnetic actinic radiations of an appropriate wavelength, specially when the overlayer is substantially thick.

Single elements, such as halogens, are also capable of reacting with a metallic layer when exposed to electromagnetic actinic radiation.

A general grouping of inorganic materials suitable for forming an actinically reactive overlayer when disposed on a metallic layer therefore consists of halogens, sulfur, selenium, M–X compounds and mixtures and M–X–Y compounds and mixtures, wherein M is a metal and X and Y are selected from the group consisting of a halogen, sulfur, selenium and tellurium; the metal M in the compounds and mixtures is selected from the group consisting of arsenic, antimony, bismuth, selenium, tellurium, copper, zinc, cadmium, mercury, lead, chromium, gallium, indium, thallium, germanium, tin, iron, cobalt, nickel and silver.

A particularly suitable binary material presenting substantial sensitivity when deposited on a layer of silver, copper, cadmium, lead, zinc or other metal is an arsenic-sulfur compound or mixture in a glassy or vitreous form and which presents remarkably good radiation transmissivity from the infrared to the ultraviolet region of the electromagnetic spectrum. The proportions of arsenic and sulfur may be any adequate proportion which permit to obtain a vitreous material, such proportions preferably ranging from about 40 percent arsenic—60 percent sulfur by weight to 70 percent arsenic—30 percent sulfur by weight.

In copending application, Ser. No. 839,038, Filed July 3, 1969, there is disclosed several examples of preparation of electromagnetic radiation sensitive elements according to the invention. According to such methods, an electromagnetic radiation sensitive element such as element 10 of FIGS. 1 and 2 may be made, for example, by providing a metallic foil of silver or copper of a few microns to a few mils thick defining the metallic layer 12 with a layer 14 of inorganic material, sprayed thereon, brushed thereon, obtained by cathode sputtering, vapor deposition or any other convenient method.

For example, vapor deposition techniques may be used for depositing on the top of one face of the silver or copper foil 12 a layer 14 of any of the inorganic materials hereinbefore listed. Typically, the silver or copper foil is placed in a bell jar evacuated at about 0.1 micron pressure. A quartz crucible is placed in the bell jar in an electrical resistance heater and is loaded with the inorganic material, such as for example arsenic and sulfur in the proportions of 50—50 percent by weight, or pieces or arsenic trisulfide, $As_2S_3$. The surface of the silver or copper foil is typically located at a distance of about 6 inches from the quartz crucible. The arsenic-sulfur mixture or arsenic trisulfide is heated in the crucible to about 350° to 400° C, and a thin film of arsenic-sulfur or arsenic trisulfide, forming the overlayer 14, is deposited on the surface of the silver or copper foil by evaporating the arsenic-sulfur mixture or arsenic trisulfide from the quartz crucible for about 30 to 40 seconds, thus providing a thickness of the layer 14 of approximately 4,000 A. Longer deposition times provide greater thickness of the layer 14, while shorter deposition times provide proportionally thinner overlayers.

Any one of the herein mentioned inorganic materials may be substituted for the arsenic-sulfur mixture or arsenic trisulfide and other techniques may be used for depositing the overlayer 14 upon the metallic layer 12 as previously mentioned.

The examples of configurations and applications of the present invention are herein explained in detail preferably with respect to a radiation sensitive element, such as shown at 10, having a metallic layer 12 made of a strip of foil of a metal having good electrical conductivity such as silver or copper, or mixtures thereof, provided with a solid adhering layer 14 of arsenic-sulfur, or arsenic trisulfide, although the invention accomplishes practically the same results by utilizing any one of the above listed components. In certain applications, there are some definite advantages in utilizing the material forming the layer 14 in a liquid phase, or, preferably, in a vapor phase, as particularly disclosed in copending patent application Ser. No. 839,038, filed July 3, 1969, which is a continuation-in-part of application Ser. No. 636,864, filed May 8, 1967, and now abandoned.

By utilizing the material of layer 14 in a vapor state, there results the definite advantage that the finished article, electrical component or electrical circuit, needs not be protected by means of a shield from further exposure to electromagnetic actinic radiation. The same result, however, may be accomplished, by removing the interreaction products and the unexposed portions of layer 14 after exposure to electromagnetic actinic radiation of the radiation sensitive element under controlled conditions, in order to prevent deterioration or change of the electrical characteristics of the component or circuit as a result of subsequent exposure to electromagnetic radiation. For some applications, however, utilizing a radiation sensitive element having a layer 14 in a solid state presents definite advantages of good electrical insulation, when materials such as arsenic trisulfide, having a resistivity of about $10^{15}$ohm-cm, is used, or when the interreaction product is used as part of the electrical component or circuit, as will be disclosed hereinafter. Therefore, for the sake of describing the present invention, the disclosure thereof has been arbitrarily chosen to be in terms of utilizing an electromagnetic radiation sensitive element comprising a layer 14 made of material in a solid phase.

Figure 3:
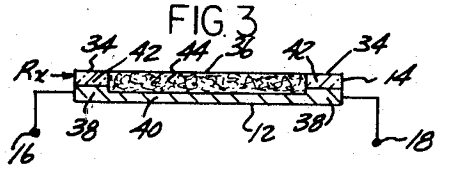
FIG. 3 is a view similar to FIG. 2, but showing the radiation sensitive element after exposure to incident electromagnetic radiation.

The radiation sensitive element 10 of FIGS. 1 and 2 is provided with a pair of terminals 16 and 18 electrically connected across a portion or length of the metallic layer 12. The radiation sensitive element 10 is exposed to incident electromagnetic actinic radiation, such as ordinary white light 22, emitted by a light source such as incandescent bulbs 20. The light 22 is caused to impinge upon the surface of the radiation sensitive element 10 after passage through a mask 24 provided, in the example chosen, with portions 26 substantially transmissive of the light, portions 28 substantially non-transmissive of the light, and a portion 30 partly transmissive of the light. Consequently, the surface of the radiation sensitive element 10 is fully irradiated at portions such as shown at 32, corresponding to the portions 26 of mask 24 which are fully transmissive of the light 22, while other portions such as shown at 34 are substantially completely screened from the effect of light. A further portion, as shown at 36, is impinged upon with light of a reduced intensity. For a given exposure to light, portions of the metallic layer 12 corresponding to the portion 32 fully irradiated are entirely consumed as a result of the light induced interreaction between the metallic layer and the material, such as arsenic trisulfide, of layer 14. The portions of the metallic layer 12 corresponding to masked portions 34 remain uneffected, while the portion of the metallic layer corresponding to area 36 partially irradiated is partially etched in depth of an amount corresponding to such irradiation intensity. Consequently, a sectional view of the radiation sensitive element 10 through substantially the axis including terminal 16 and 18 is as schematically represented at FIG. 3, with the result that the metallic layer 12 comprises portions 38 presenting the original thickness and electrically connected to terminals 16 and 18 separated by a portion 40 of reduced thickness, the thickness of portion 40 being substantially inversely proportional to the exposure of area 36, FIG. 1, of the electromagnetic radiation sensitive element 10 to incident light. The resulting article is a resistor having a predetermined resistance depending from the resistivity of the metal or metals forming metallic layer 12, the cross sectional area offered to the passage of current therethrough, and the length of path offered to the current. Consequently, the total resistance of the resistor there formed, consisting of the remaining portion of metallic layer 12 situated between terminals 16 and 18, may be adequately determined in function of the geometric dimension of the image projected upon the radiation sensitive element, and the duration of exposure of the irradiated area 36 of the element. When the predetermined resistance of the resistor $R_x$ thus made is achieved, the irradiation of the radiation sensitive element 10 is discontinued, and the element may be encased in a shield for permanently protecting it from further irradiation, or, alternately, it may be covered with a coat of shellac or point opaque to electromagnetic actinic radiations which may affect the element and change its value. Alternately also, the remainder of the layer 14, as shown at 42 in FIG. 3, which has not been subjected to irradiation, and the portions of the layer 14, as shown at 44, which include the interreaction product resulting from the interreaction between such layer and the metallic layer 12, may be removed by the mechanical or chemical means disclosed in the aforesaid copending applications.

The resistance of the resistor obtained by way of the arrangement of FIG. 1 may be continuously monitored by means of, for example, an ohmmeter connected across the terminals 16 and 18, or by means of a bridge, such as the one illustrated, comprising resistors $R_1$, $R_2$, $R_x$ (the resistor formed by means of the method of the invention), and $R_3$ disposed in a bridge having a source of electrical current 45 placed across a diagonal of the bridge and a meter 46 connected across the other diagonal of the bridge. When the bridge is in equilibrium, the current flowing through the meter 46 is nil, and the resistance of resistor $R_x$ is given by the formula:

$$R_x = R_2 \times R_3/R_1$$

Consequently, for given values of $R_1$, $R_2$ and $R_3$ the value of $R_x$ may be continuously monitored until it reaches a value whereby the meter 46 indicates that the bridge is in equilibrium. As schematically represented, the meter 46 may be arranged to close a switch 48 when registering such null, or the meter 46 may be replaced by a relay as shown at 50 also adapted to open the switch 48 when a predetermined value of $R_x$ is achieved, so as to disconnect the light bulbs 20 from a source of power 52 for the purpose of discontinuing exposure of the element 10 to light.

Figure 4:
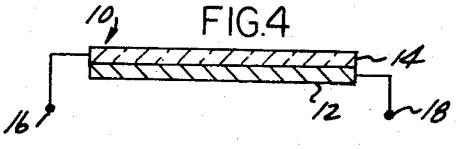
FIG. 4 is a view similar to FIG. 2 but showing a modification of radiation sensitive element.
Figure 5:
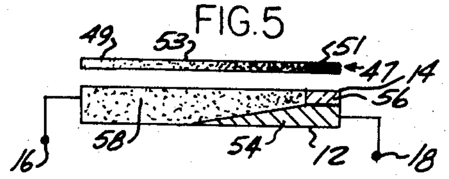
FIG. 5 is a view similar to FIG. 4 but showing the radiation sensitive element after exposure to incident electromagnetic actinic radiation.

The resistivity of the portion of the layer 14 exposed to electromagnetic actinic radiation is decreased as a function of the exposure thereof, as a result of the formation of the interreaction product which tends to remain in a solid solution within the material of the layer 14. As previously mentioned, the resistivity of arsenic trisulfide is $10^{15}$ohm-cm and the resistivity of a layer 14 of arsenic trisulfide may be reduced by a considerable amount if disposed in contact with a layer of metal 12, for example made of silver, the resistivity of the arsenic trisulfide layer decreasing proportionally to the exposure tending towards a minimum value remaining constant after all the silver of the metallic layer has been exhausted. Consequently, a resistor according to the present invention can be made by way of a radiation sensitive element 10, as shown in FIG. 4, identical to the radiation sensitive element 10 of FIG. 2, but being provided with a terminal, such as terminal 16, being connected to the layer 14, and another terminal, such as terminal 18, being connected to the metallic layer 12. Exposure of the radiation sensitive element 10 of FIG. 4 to electromagnetic radiation through a mask such as mask 47 of FIG. 5 presenting, along a longitudinal section thereof, one extreme portion 49 completely transmissive of the electromagnetic actinic radiation, another extreme portion 51 substantially non-transmissive of the electromagnetic actinic radiation, and an intermediary portion 53 gradually decreasing in transmissivity from portion 49 to portion 51, the resulting article, as shown in FIG. 5, presents in section a gradually decreasing portion 54 of the metallic layer 12 connected to the terminal 18, and corresponding to the gradually transmissive portion 53 of the mask 47. The finished article also includes a portion, as shown at 56, comprising the unreacted area portion of the layer 14, and a portion proximate to and attached to the terminal 16 made of an entirely reacted area of the layers 12 and 14, as shown at 58. The portion of layer 14 corresponding to gradually decreasing transmissive portion 53 of the mask 47 has a progressively decreasing resistivity, from right to left as seen in FIG. 5, such that the total resistance between terminals 16 and 18 may be determined, within limits, as a result of the total exposure of the element to electromagnetic actinic radiation.

It can thus be seen that electrical components such as resistors, of predetermined resistance values, can be obtained by utilizing the radiation sensitive elements according to the present invention as a result of practicing the method of the present invention.

Figure 6:
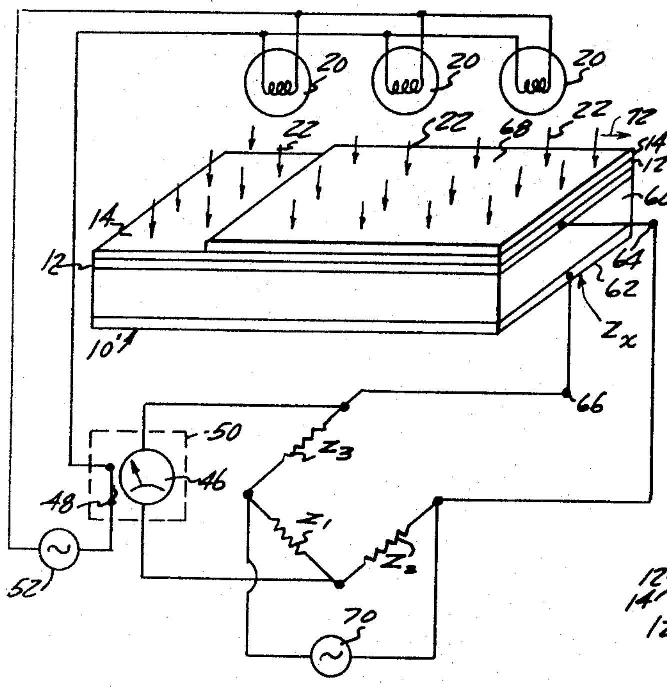
FIG. 6 is a schematic representation of an arrangement according to another aspect of the present invention for obtaining an electrical component such as a capacitor having a predetermined capacitance.
Figure 7:
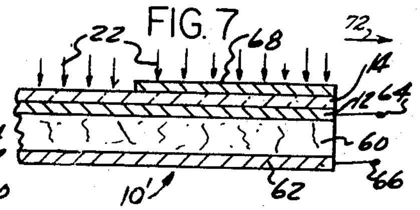
FIG. 7 is a sectional view of a portion of a radiation sensitive element for use in the arrangement as shown in FIG. 6.

Referring now to FIGS. 6 and 7, there is shown a radiation sensitive element 10' according to a further aspect of the present invention, which, as best shown in the sectional view of FIG. 7, comprises a metallic layer 12 provided with an overlayer 14 of inorganic material capable, when exposed to electromagnetic actinic radiation, to interreact with the metal or metals of the metallic layer 12. The metallic layer 12 is in turn disposed, adhering thereto, on one face of a dielectric layer 60 provided with a further metallic layer 62 on its other face. An electrical terminal 64 is attached to the metallic layer 12, and a second electrical terminal 66 is attached to the metallic layer 62. Such an assembly forms a capacitor having parallel plates defined by the metallic layers 12 and 62 whose capacitance, as is well known, is given by the following formula:

$$C = K\,A/d \text{ Micromicrofarad,}$$

wherein $A$= plate effective area in $cm^2$ $d$= thickness of the dielectric in cm, K = 0.0085єr, wherein єr is equal to the dielectric constant of the dielectric relatively to air.

As is well known, the useful effective area A of a parallel plate capacitor, whose capcitance is according to the above formula, is actually the coincidence areas of the plates, and in order to decrease the capacitance of a capacitor it is sufficient to decrease the coincidence areas of the plates which may be done by decreasing the area of one of the plates and leaving the area of the other plate unchanged. This is accomplished, according to one aspect of the present invention, by providing a shield 68 capable of shielding the sensitive surface of element 10' from impinging electromagnetic actinic radiation such as light, shown at 22, emitted by a source such as incandescent bulbs 20.

In order to monitor the capacitance value of the capacitor defined by element 10', it is connected in a bridge circuit such as shown in FIG. 6, such bridge including impedance $Zx$, the impedance of the capacitor being made according to the method of the invention, and known impedances $Z_1$, $Z_2$ and $Z_3$. Across a diagonal of the bridge is connected a source of alternating current 70 of known frequency $f$. Across the other diagonal of the bridge is connected an ammeter 46. At equilibrium, the ammeter 46 registers a null and the impedance $Zx$ is given by the formula:

$$Zx = Z_2 \times Z_3/Z_1,$$

and the capacitance of the capacitor is derived from the formula: $Z_x = -1/2\pi fC$.

The ammeter 46 may be arranged to open a switch 48 placed in series between a source of electrical power 52 and the light bulbs 20 or, alternately, a relay, as shown at 50 may be used to directly open the switch 48 when the impedance $Zx$ of the capacitor reaches a predetermined value.

In order to decrease the capacitance of the capacitor, the shield 68 is displaced in the direction shown by arrow 72, see FIGS. 6 and 7, so as to increase the area of the metallic layer 12 interreacting with the overlayer 14 under the influence of electromagnetic actinic radiation impinging thereupon.

Figure 8:
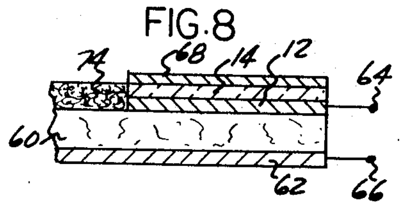
FIG. 8 is a view similar to FIG. 7, but showing the radiation sensitive element after exposure to electromagnetic actinic radiation.

The capacitor, after exposure to electromagnetic actinic radiation of element 10', as shown at FIG. 8, comprises a first plate consisting of the metallic layer 62 connected to terminal 66, and a second plate formed by the unreacted remaining area of the metallic layer 12 connected to terminal 64, separated by the dielectric layer 60. The portion or area of the metallic layer 12 not shielded by the shield 68 from the action of impinging electromagnetic actinic radiation has been caused to interreact with the inorganic material of the layer 14, thus consuming in depth the metal of the metallic layer 12 with formation of interreaction products as shown at 74 and effectively trimming the effective plate area of the capacitor.

Therefore, according to the principles of the present invention, a capacitor of a predetermined value can be manufactured and precisely trimmed to a predetermined capacitance value by means of electromagnetic actinic radiation such as light. An element such as element 10' of FIG. 7 may be made of a sheet of dielectric material 60, such as a resin impregnated board, an epoxy board, or the like, a few microns or mils thick provided with a silver or copper bonded on both faces thereof to form the metallic layers 12 and 62. The layer 14 of inorganic material is placed on the metallic layer 12 by any one of the methods hereinbefore mentioned, such as the vacuum deposition process hereinbefore explained in details.

If so desired, the metallic layers 12 and 62, or either one, may be obtained, typically, also by vacuum deposition techniques, specially where it is desired to obtain on the dielectric substrate 60 an adhering metallic layer substantially thinner than commercially available in foil form. For example, a sheet of epoxy constituting the dielectric substrate 60 of any appropriate dimension, 1 or 2 mils thick for example, is placed in a bell jar evacuated at about 0.5 micron pressure. Silver or copper metal is evaporated from tungsten electrical resistance heaters disposed in the bell jar and brought to about 1,100° C by the passage of electrical current therethrough, a silver or copper coating or ribbon being disposed on the tungsten filament. By evaporating the silver or copper for about 3 seconds, a metallic layer 12 or 62 having a thickness of about 4,000 A. is condensed on the epoxy substrate 60. Longer evaporation times provide proportionally thicker metallic layers. For example, 15 to 20 seconds evaporation time provides metallic layers on the substrate having a thickness of approximately one micron. The thickness of the metallic thin film or layer can be continuously monitored by means of a thickness monitor.

Figure 9:
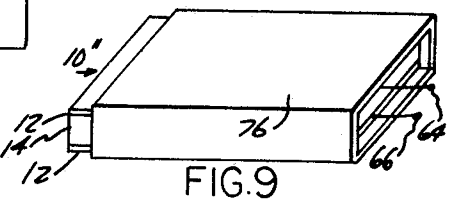
FIG. 9 is a perspective view of a modification of the radiation sensitive element incorporated in the arrangement of FIG. 6.
Figure 10:
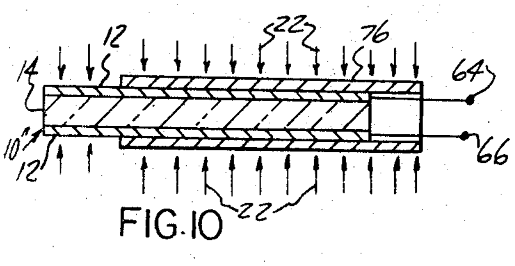
FIG. 10 is a sectional view thereof.
Figure 11:
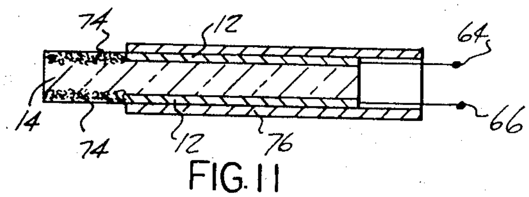
FIG. 11 is a sectional view thereof after exposure to electromagnetic actinic radiation.

FIGS. 9–10 represent a variation of a capacitor made according to a further aspect of the present invention which, as best shown in FIG. 10, comprises a radiation sensitive element 10'' comprising a layer 14 made of the same inorganic material as layers 14 in the hereinbefore described sensitive elements, for example made of arsenic-sulfur, arsenic trisulfide or arsenic pentasulfide, having on each face thereof a substantially thin metallic layers 12, thin enough so that, when exposed to electromagnetic actinic radiation, the metallic layers are capable of transmitting the electromagnetic actinic radiation so as to provoke an interreaction between the inorganic material of the layer 14 and the metal or metals of the metallic layers 12. A shield is disposed as shown at 76, which is slidable in such a manner that a portion of the radiation sensitive element 10'' may be subjected to irradiation on at least one side thereof or, as shown, on both sides thereof so as to form at such impinged areas an interreaction product 74, see FIG. 11, consuming the impinged areas of the metallic layers 12. The resulting article, as shown in FIG. 11, is a capacitor of a predetermined value depending from the extent of the areas exposed to electromagnetic actinic radiation, the plates thereof being defined by the remaining unreacted portions of the metallic layers 12 connected to the terminals 64 and 66.

Figure 12:
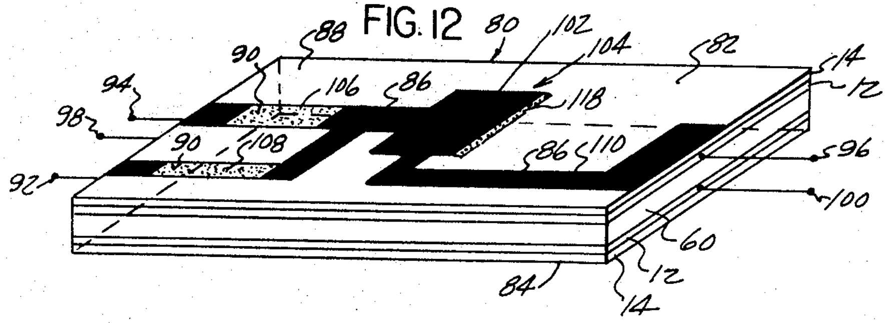
FIG. 12 is a schematic perspective representation of a radiation sensitive element for obtaining electrical circuit by way of the method of the present invention.
Figures 13, 15:
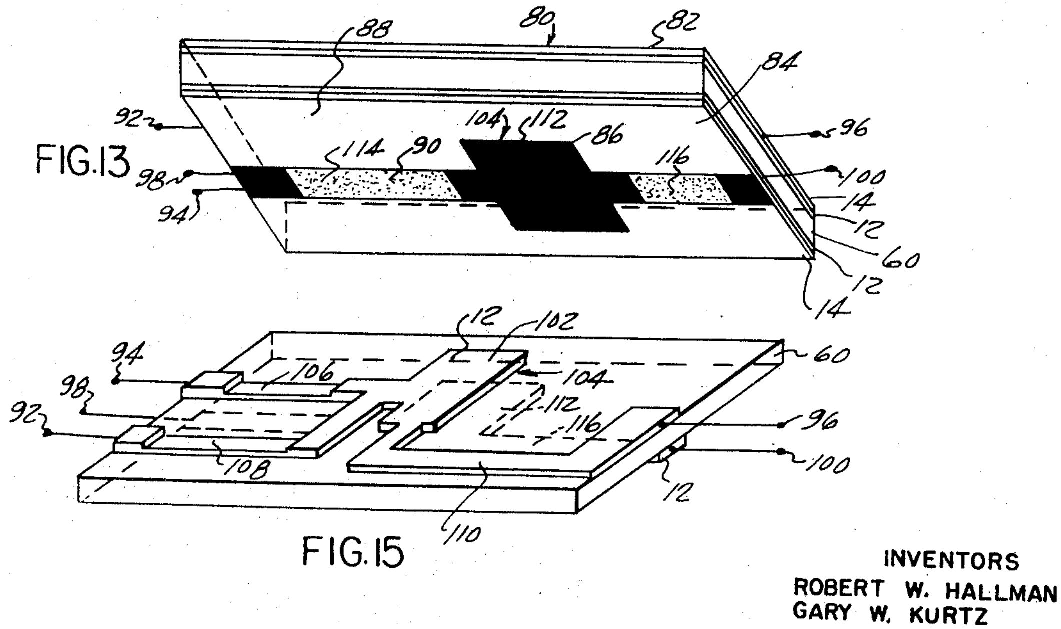
FIG. 13 is a perspective schematic view of the element of FIG. 12, but showing more clearly a face not visible in FIG. 12.
FIG. 15 is a schematic perspective view of an electrical integrated circuit obtained by the method of the invention.

Radiation sensitive elements according to the present invention and as hereinbefore described may be used to obtain integrated circuits by simple exposure to electromagnetic actinic radiation through a mask or by projection thereon of a predetermined pattern, an example thereof being shown in FIGS. 12–15. A radiation sensitive element 80 is made by coating a sheet of dielectric 60 of appropriate thickness with a substantially thin metallic layer 12 on both faces thereof, such metallic layer being in turn covered with an overlayer 14 of inorganic material capable of reacting, when exposed to electromagnetic actinic radiation, with the metal of the layers 12, as explained hereinbefore and in the co-pending applications. The first face 82 of the radiation sensitive element 80 is exposed to radiation through a mask or as a result of a pattern being projected thereon, as shown in FIG. 12, such pattern having portions such as shown in black at 86 shielding the face 82 of the element from impinging electromagnetic actinic radiation, other portions such as shown at 88 permitting full impact of the electromagnetic actinic radiation on such face, and other portions such as shown at 90 permitting reduced irradiation of the radiation sensitive surface. The other face 84 of the element 80 is also exposed to electromagnetic actinic radiation, as shown in FIG. 13, portions being impacted thereon as shown at 88 with full radiation intensity, other portions being impacted upon with reduced radiation intensity as shown at 90, and still other portions being shielded from the action of the electromagnetic actinic radiation, as shown at 86. Terminals as shown at 92, 94, and 96, are attached, either before or after exposure to electromagnetic actinic radiation, to the edges of the metallic layer 12 of the face 82, and terminals such as shown at 98 and 100 are attached to the metallic layer 12 of the face 84. The finished article is an integrated circuit wherein the portions of the metallic layers 12 which are unreacted, corresponding to the areas 86, constitute conductors or capacitor plates, and every area of the metallic layers, such as areas 90, which has been partly exposed to radiation constitutes a resistor of a resistance value depending from the amount of impinging actinic radiation and the geometric dimensions of the area.

Figure 14:
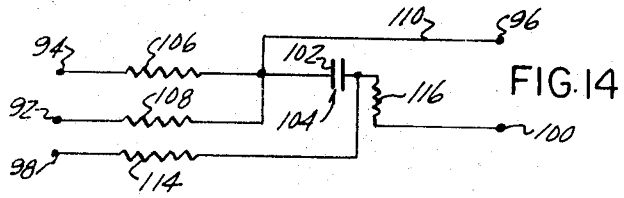
FIG. 14 is a schematic representation of the circuit obtained by way of the element of FIGS. 12–13, shown by way of conventional electrical symbols.

The resulting article is consequently an electrical circuit, the diagrammatic equivalent whereof is shown at FIG. 14, comprising the capacitor plate 102 of a capacitor 104 being connected to the terminal 94 through a resistor 106, to the terminal 92 through a resistor 108 and to the terminal 96 through a conductor 110, all defined on the face 82 of the element 80. The other plate, plate 112, of the capacitor 104 is connected to the terminal 98 through a resistor 114 and is also connected to the terminal 100 through a resistor 116, the various areas shown in FIGS. 12–13 being identified by the same reference numerals as in the schematic of FIG. 14 in order to aid in understanding the equivalency therebetween. If the area of one of the plates 102 or 112 of the capacitor 104 needs to be trimmed to obtain a more precise value of the capacitance of the capacitor, or for precisely adjusting the circuit to predetermined electrical characteristics, an area of one of the plates such as shown at 118 with respect to the plate 102 in FIG. 12 may be subsequently individually exposed to electromagnetic actinic radiation as previously explained, and the value of each resistor may be also individually precisely determined by further exposure discretely and selectively to electromagnetic actinic radiation, keeping in mind, however, that the controllable variations of component values are of course toward a decrease in capacitance with respect to capacitors and an increase in resistance with respect to resistors.

The finished monolithic circuit may be encased in an enclosure adapted to protect the radiation sensitive faces 82 and 84 of the element from further irradiation, or it may be coated with an opaque varnish or the like, or alternately, the unreacted and reacted portions of the layers may be mechanically or chemically removed so as to provide a circuit as shown in FIG. 15, being the full equivalent of the schematic of FIG. 14.

In view of the fact that radiation sensitive elements according to the present invention and to the disclosure of the copending applications, under certain conditions and for certain group of materials, behave as semi-conductors, it is also possible, by using the structure and methods of the present invention to obtain complete integrated circuits including unidirectional elements and unidirectional elements provided with control means, such as diodes and transistors, and the like.

While the foregoing description sets forth the principles of the present invention in connection with specific structures and methods, it is to be understood that the disclosure thereof is made only by way of examples and not as a limitation of the scope of the invention.

We claim:

1. A method for making an electrical component of the class having a substantially low resistivity member juxtaposed with a substantially high resistivity member by means of a radiation sensitive element comprising at least a first layer of a relatively low electrical resistivity material defining said low resistivity member and an adhering second layer of a relatively high electrical resistivity inorganic material different from that of said first layer and defining said high resistivity member and capable when exposed to electromagnetic actinic radiation to interreact with said first layer so as to form an interreaction product having a composition and an electrical resistivity intermediate to the compositions and resistivities of respectively said first and second layers, wherein said first layer is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the inorganic material of said second layer is substantially transmissive of said actinic radiation and is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising:

exposing said radiation sensitive element to incident electromagnetic actinic radiation with an intensity and for a period of time sufficient for causing the formation of a predetermined amount of said interreaction product of said intermediate resistivity providing said radiation sensitive element with electrical terminals;

permanently shielding said element from said incident electromagnetic actinic radiation for preventing further formation of said interreaction product.

2. The method of claim 1 further comprising the steps of:

continuously monitoring the electrical characteristics of said radiation sensitive element during exposure thereof to said electromagnetic actinic radiation; and discontinuing said exposure when predetermined electrical characteristics of said radiation sensitive element are achieved.

3. A method for making a resistor by means of a radiation sensitive element comprising a first layer of a relatively low electrical resistivity material juxtaposed with and adhered to a second layer of a relatively high electrical resistivity inorganic material different from that of said first layer and capable when exposed to electromagnetic actinic radiation to interreact with said first layer so as to form an interreaction product having an electrical resistivity intermediate to the resistivities of respectively said low and high resistivity materials, wherein said first layer is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the inorganic material of said second layer is substantially transmissive of said actinic radiation and is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising:

exposing said radiation sensitive element to incident electromagnetic actinic radiation with an intensity and for a period of time sufficient for causing the formation of a predetermined amount of said interreaction product of said intermediate resistivity with consumption in depth of a portion of said first layer;

providing said radiation sensitive element with electrical terminals; and permanently shielding said radiation sensitive element from said incident electromagnetic actinic radiation for preventing further formation of said interreaction product.

4. The method of claim 3 wherein said terminals are electrically connected to said first layer.

5. The method of claim 3 wherein at least one of said terminals is electrically connected to said second layer.

6. The method of claim 3 further comprising:

continuously monitoring the resistance of said resistor during exposure of said radiation sensitive element; and discontinuing said exposure when a predetermined resistance of said resistor is achieved.

7. A method for making a capacitor by means of a radiation sensitive element comprising a first layer of a relatively low electrical resistivity material defining a first plate of said capacitor juxtaposed with and adhered to a second layer of a relatively high electrical resistivity inorganic material different from that of said first layer and capable when exposed to electromagnetic actinic radiation to interreact with said first layer so as to form an interreaction product having an electrical resistivity intermediate to the resistivities of respectively said low and high resistivity materials, said first layer being in turn disposed on a face of a dielectric provided with a metallic layer on the other face thereof defining a second plate of said capacitor, wherein said first layer is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the inorganic material of said second layer is substantially transmissive of said actinic radiation and is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising:

exposing said radiation sensitive element to incident electromagnetic actinic radiation with an intensity and for a period of time sufficient for causing the formation of a predetermined amount of said interreaction product of said intermediate resistivity with consumption in depth of a portion of said first layer for trimming the area of said first plate to a predetermined area;

providing said first layer and said metallic layer with electrical terminals; and permanently shielding said radiation sensitive element from said incident electromagnetic actinic radiation for preventing further formation of said interreaction product.

8. The method of claim 6 further comprising:

continuously monitoring the capacitance of said capacitor during exposure of said radiation sensitive element; and discontinuing said exposure when a predetermined capacitance of said capacitor is achieved.

9. A method for making an electrical circuit comprising at least a resistor and a capacitor, electrical connections therebetween and input and output terminals, by means of a radiation sensitive element comprising a first layer of a relatively low resistivity material juxtaposed with and adhered to a second layer of a relatively high resistivity inorganic material different from that of said first layer and capable when exposed to electromagnetic actinic radiation to interreact with said first layer so as to form an interreaction product having an electrical resistivity intermediate to the resistivities of respectively said low and high resistivity materials, said first layer being in turn disposed on a face of a dielectric provided with a metallic layer on the other face therewith, wherein said first layer is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the inorganic material of said second layer is substantially transmissive of said actinic radiation and is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising:

exposing areas of said radiation sensitive element to incident electromagnetic actinic radiation projected thereon according to a predetermined pattern with an intensity and for a period of time sufficient for causing the formation of said interreaction product consuming in depth all of said first layer at said areas;

simultaneously shielding from said incident electromagnetic actinic radiation other areas of said radiation sensitive element in a predetermined pattern for leaving in said first layer an electrically conducting network defining said resistor, a first plate of said capacitor and electrical connections therebetween;

simultaneously partly exposing to incident electromagnetic actinic radiation a first portion of said other areas corresponding to said resistor with an intensity and for a period of time sufficient for causing the formation of said interreaction product with consumption in depth of part of said first layer for forming said resistor at a predetermined resistance value;

simultaneously exposing a second portion of said other areas corresponding to said first plate of said capacitor with an intensity and for a period of time sufficient for causing the formation of said interreaction product consuming in depth said first layer for trimming the area of said plate for defining a predetermined capacitance for said capacitor;

attaching electrical terminals to appropriate portions of said first layer and to said metallic layer for forming said input and output terminals; and permanently shielding said radiation sensitive element from said incident electromagnetic actinic radiation for preventing further formation of said interreaction product.

10. The method of claim 9 further comprising the steps of:

continuously monitoring the electrical characteristics of said circuit during exposure to said electromagnetic radiation; and discontinuing said exposure when predetermined electrical characteristics are achieved.

11. A method for making an electrical circuit comprising resistors and at least a capacitor, electrical connections therebetween and input and output terminals, by means of a radiation sensitive element comprising a layer of dielectric having on both faces thereof a first layer of a first material juxtaposed with and adhered to a second layer of an inorganic material different from said first material capable when exposed to electromagnetic actinic radiation to interreact with said first material so as to form an interreaction product having an electrical resistivity intermediate to the resistivities of respectively said first and second materials, wherein said first layer is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the inorganic material of said second layer is substantially transmissive of said actinic radiation and is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising:

exposing areas of said radiation sensitive element to incident electromagnetic actinic radiation projected on both faces thereof according to predetermined patterns with an intensity and for a period of time sufficient for causing the formation of said interreaction product consuming in depth all of the material of said first layer at said areas;

simultaneously shielding from said incident electromagnetic actinic radiation other areas of said radiation sensitive element in a predetermined pattern for leaving in said first layer an electrically conducting network defining said resistors, opposed plates of said capacitor and electrical connections therebetween;

simultaneously partly exposing to incident electromagnetic actinic radiation a first portion of said other areas corresponding to said resistors with an intensity and for a period of time sufficient for causing the formation of said interreaction product with consumption in depth of part of said first layers for forming said resistors at a predetermined resistance value;

simultaneously exposing to incident electromagnetic actinic radiation a second portion of said other areas corresponding to said plates of said capacitor with an intensity and for a period of time sufficient for causing the formation of said interreaction product consuming in depth said first layers for trimming the area of said plates for defining a predetermined capacitance for said capacitor;

attaching electrical terminals to appropriate portions of said first layers for forming said input and output terminals; and permanently shielding said element from said incident electromagnetic actinic radiation for preventing further formation of said interreaction product.

12. The method of claim 11 further comprising the steps of:

continuously monitoring the electrical characteristics of said circuit during exposure to said electromagnetic radiation; and discontinuing said exposure when predetermined electrical characteristics are achieved.

* * * * *